US012254312B2

(12) United States Patent
Perumalla et al.

(10) Patent No.: US 12,254,312 B2
(45) Date of Patent: Mar. 18, 2025

(54) SCENARIO AWARE DYNAMIC CODE BRANCHING OF SELF-EVOLVING CODE

(71) Applicant: INTERNATIONAL BUSINESS MACHINES CORPORATION, Armonk, NY (US)

(72) Inventors: Saraswathi Sailaja Perumalla, Visakhapatnam (IN); Sarbajit K. Rakshit, Kolkata (IN); Sowjanya Rao, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 17/806,794

(22) Filed: Jun. 14, 2022

(65) Prior Publication Data
US 2023/0401909 A1 Dec. 14, 2023

(51) Int. Cl.
| | | |
|---|---|---|
| *G06F 8/71* | (2018.01) | |
| *G06F 8/30* | (2018.01) | |
| *G06F 8/60* | (2018.01) | |
| *G06F 11/30* | (2006.01) | |
| *G06F 11/34* | (2006.01) | |
| *G07C 5/08* | (2006.01) | |

(52) U.S. Cl.
CPC ............ *G06F 8/71* (2013.01); *G06F 8/30* (2013.01); *G06F 11/3013* (2013.01); *G06F 11/302* (2013.01); *G06F 11/3409* (2013.01); *G06F 8/60* (2013.01); *G07C 5/0808* (2013.01)

(58) Field of Classification Search
None
See application file for complete search history.

(56) References Cited

U.S. PATENT DOCUMENTS

| | | | |
|---|---|---|---|
| 11,088,784 B1 | 8/2021 | Gopalan | |
| 2008/0234998 A1* | 9/2008 | Cohen | G06F 9/451 703/24 |
| 2015/0277915 A1* | 10/2015 | Kelm | G06F 9/4552 712/226 |
| 2016/0321038 A1* | 11/2016 | Ge | G06F 9/44521 |
| 2018/0210734 A1* | 7/2018 | Jiang | G06F 9/3804 |
| 2020/0371906 A1* | 11/2020 | Tertzakian | G06F 11/3612 |

(Continued)

FOREIGN PATENT DOCUMENTS

| | | |
|---|---|---|
| CN | 112114791 A | 12/2020 |
| CN | 112744226 A | 5/2021 |

OTHER PUBLICATIONS

Becker, K., "Using Artificial Intelligence to Write Self-Modifying/Improving Programs", Artificial Intelligence, Programming, Software Development , Primary Objects, Jan. 27, 2013, 36 pgs., <http://www.primaryobjects.com/2013/01/27/using-artificial-intelligence-to-write-self-modifying-improving-programs/>.

(Continued)

*Primary Examiner* — Ryan D. Coyer
(74) *Attorney, Agent, or Firm* — Kelsey M. Skodje

(57) ABSTRACT

Computer technology for performing dynamic code branching of self-adapted code upon successful execution of a contextual scenario by artificial intelligence (AI) enabled edge device (for example, an autonomous vehicle or an industrial robotic device). predicting a second contextual scenario where the AI enabled edge device can perform a predetermined activity, and proactively deploying self-adapted code on the AI enabled edge device.

18 Claims, 3 Drawing Sheets

(56) References Cited

U.S. PATENT DOCUMENTS

| | | | |
|---|---|---|---|
| 2021/0179144 A1 | 6/2021 | Kain | |
| 2021/0325901 A1* | 10/2021 | Gyllenhammar | ............................ B60W 50/0098 |
| 2022/0327826 A1* | 10/2022 | Chaterji | ................. G06V 10/82 |
| 2023/0192147 A1* | 6/2023 | Raina | ................. G01C 21/3804 701/23 |
| 2023/0252280 A1* | 8/2023 | Donderici | ................ G06N 3/08 706/25 |

OTHER PUBLICATIONS

Real, et al., "AutoML-Zero: Evolving Code that Learns", Google AI Blog, Google Research, Jul. 9, 2020, 4 pgs., https://ai.googleblog.com/2020/07/automl-zero-evolving-code-that-learns.html>.

* cited by examiner

SCENARIO AWARE DYNAMIC CODE BRANCHING OF SELF-EVOLVING CODE

BACKGROUND

The present invention relates generally to the field of self-evolving computer code and more particularly to branching of self-evolving computer code.

The Wikipedia entry for "Self-modifying code" (as of Mar. 30, 2022) states, in part, as follows: "In computer science, self-modifying code (SMC) is code that alters its own instructions while it is executing—usually to reduce the instruction path length and improve performance or simply to reduce otherwise repetitively similar code, thus simplifying maintenance. Self-modification is an alternative to the method of 'flag setting' and conditional program branching, used primarily to reduce the number of times a condition needs to be tested. The term is usually only applied to code where the self-modification is intentional, not in situations where code accidentally modifies itself due to an error such as a buffer overflow. The method is frequently used for conditionally invoking test/debugging code without requiring additional computational overhead for every input/output cycle."

The Wikipedia entry for "Branch (computer science)" (as of Mar. 30, 2022) states, in part, as follows: "A branch is an instruction in a computer program that can cause a computer to begin executing a different instruction sequence and thus deviate from its default behavior of executing instructions in order. Branch (or branching, branched) may also refer to the act of switching execution to a different instruction sequence as a result of executing a branch instruction. Branch instructions are used to implement control flow in program loops and conditionals (i.e., executing a particular sequence of instructions only if certain conditions are satisfied). A branch instruction can be either an unconditional branch, which always results in branching, or a conditional branch, which may or may not cause branching depending on some condition. Also, depending on how it specifies the address of the new instruction sequence (the 'target' address), a branch instruction is generally classified as direct, indirect or relative, meaning that the instruction contains the target address, or it specifies where the target address is to be found (e.g., a register or memory location), or it specifies the difference between the current and target addresses." (footnote(s) omitted)

SUMMARY

According to an aspect of the present invention, there is a method, computer program product and/or system that performs the following operations (not necessarily in the following order): (i) monitoring, using a set of sensor device(s), an artificial intelligence (AI) enabled edge device, with the AI enabled edge device including edge device control code including a plurality of code branches, with each code branch respectively corresponding to a plurality of contextual scenarios; (ii) during the monitoring, operating the AI enabled edge device in a first contextual scenario; and (iii) analyzing, by the AI enabled edge device, performance of the AI enable edge device in the first contextual scenario based on the monitoring by the set of sensor device(s) to identify a code branch name for the first contextual scenario.

DETAILED DESCRIPTION

Figure 1:
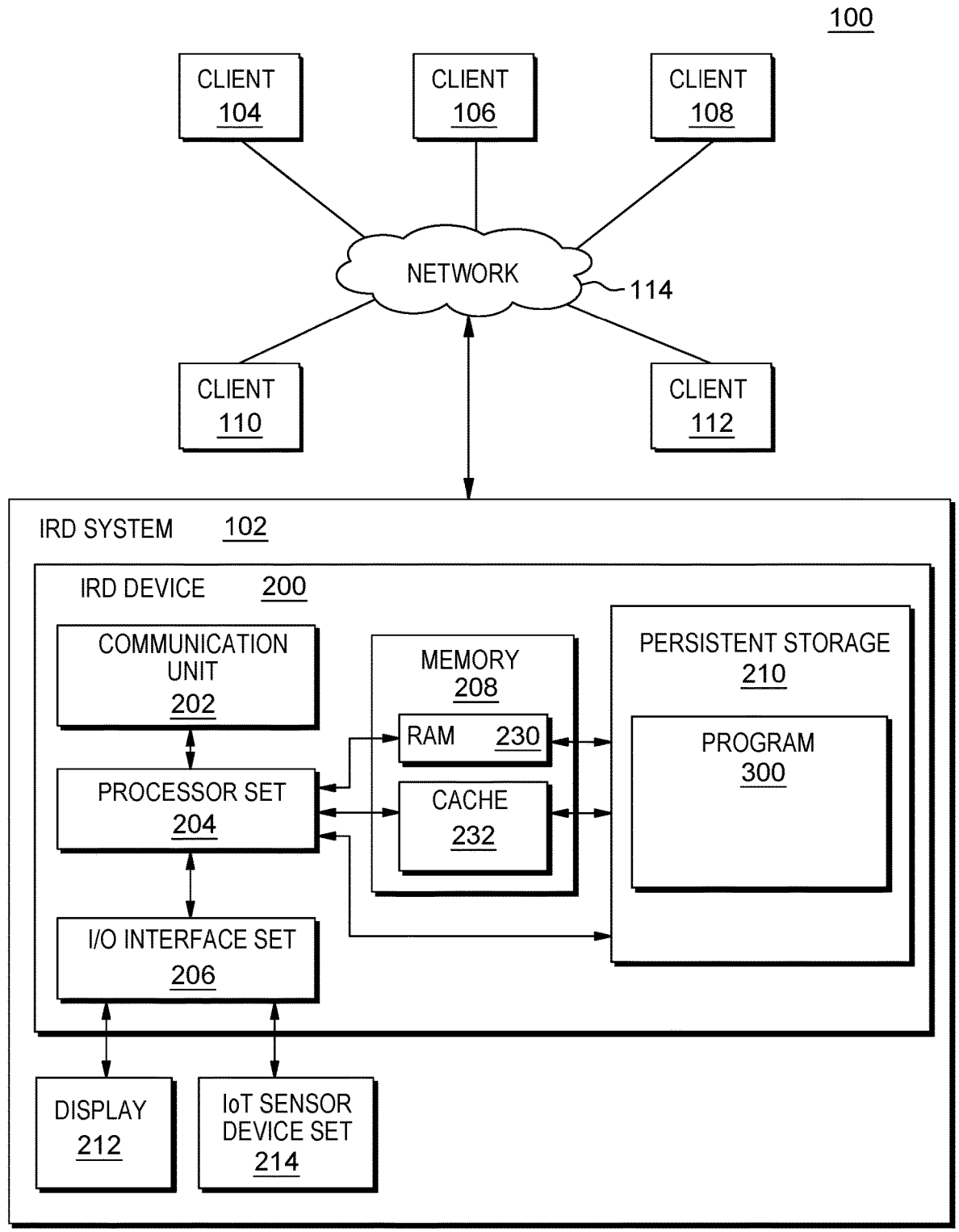
FIG. 1 is a block diagram of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semi-conductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: IRD (industrial robotic device) system 102 (sometimes herein referred to, more simply, as system 102); client subsystems 104, 106, 108, 110, 112; and communication network 114. IRD system 102 includes: IRD device 200; communication unit 202; processor set 204; input/output (I/O) interface set 206; memory 208; persistent storage 210; display 212; IoT sensor device set 214; random access memory (RAM) 230; cache 232; and program 300.

System 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

System 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

System 102 is shown as a block diagram with many double arrows. These double arrows (no separate reference numerals) represent a communications fabric, which provides communications between various components of system 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) IoT sensor device set 214 may be able to supply, some or all, memory for system 102; and/or (ii) devices external to system 102 may be able to provide memory for system 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to system 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with IRD device 200. For example, I/O interface set 206 provides a connection to IoT sensor device set 214. IoT sensor device set 214 will typically include devices such as a keyboard, keypad, a touch screen, and/or some other suitable input device. IoT sensor device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
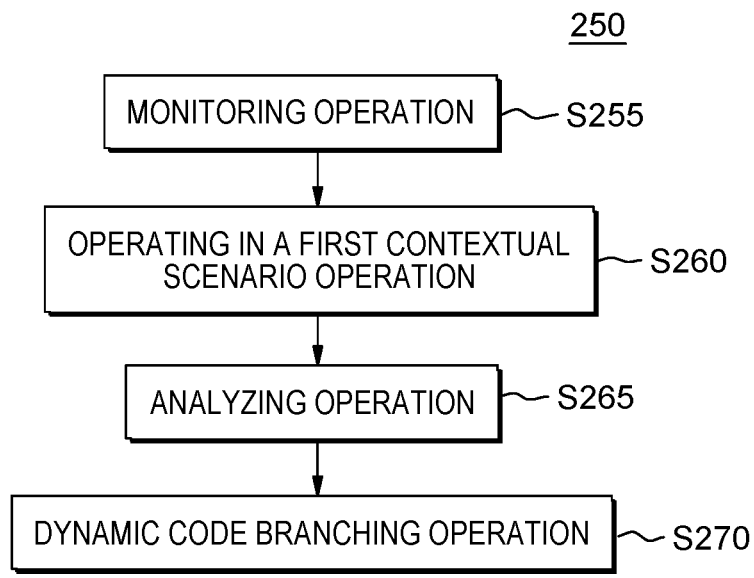
FIG. 2 is a flowchart showing a first embodiment method performed, at least in part, by the first embodiment system.
Figure 3:
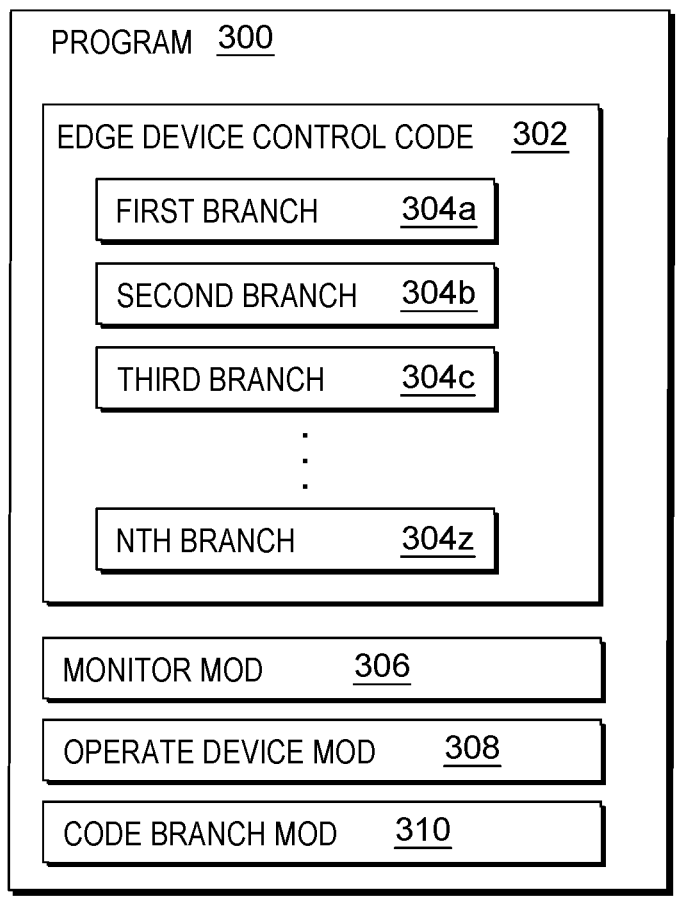
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation 5255, where monitor module ("mod") 306 monitors an artificial intelligence (AI) enabled edge device, which, in this example is industrial robotic device (IRD) 200, which is configured as an edge device that performs the function of assembling vehicles. IRD system 102 includes edge device control code 302 including a multiple code branches 304a to 304z, with each code branch respectively corresponding to a different contextual scenarios. The contextual scenarios indicate different sets of circumstances that are relevant to how assembly of the vehicles is performed. In this example, one contextual scenario is a situation where there is a "brown out" and the auto assembly plant is operating at low power. In this example, another contextual scenario occurs when there are humans in vicinity of IRD system 102 as it performs its potentially dangerous assembly work. In this example, the set of sensor device(s) is IoT sensor device set 214.

Processing proceeds to operation 5260, where concurrently with the ongoing monitoring of operation 5255, operate device mod 308 operates (that is, in this example, assembles vehicles) IRD system 102 in a first contextual scenario. In this example, the first contextual scenario is a context where the vehicles are being assembled in an environment where humidity is extraordinarily high.

Processing proceeds to operation 5265, code branch mod 310 analyzes performance of IRD system 102 in the first contextual scenario based on the monitoring by IoT sensor device set 214 to identify a code branch name for the first contextual scenario.

Processing proceeds to operation 5270, where code branch mod 310 performs dynamic code branching of self-adapted code (that is, edge device control code 302) upon successful execution of the first contextual scenario by IRD system 102.

III. Further Comments and/or Embodiments

Some embodiments of the present invention recognize the following facts, potential problems and/or potential areas for improvement with respect to the current state of the art: (i) various AI (artificial intelligence) enabled systems, for example autonomous vehicles, include vehicles performing self-learning while addressing different scenarios; (ii) there can be different types of scenarios that will be addressed by different autonomous vehicles in different contextual situations: (iii) AI is being used for modifying the programs, based on the identified scenario; (iv) AI can modify the code; (v) different vehicles will learn differently when autonomous vehicles are self-learning while addressing various scenarios, and also when generating self-adapting code; (vi) for the same scenario, different vehicles will address differently and will learn differently; (vii) when code self-evolves while addressing different scenarios, then upon successfully execution of the scenarios, there is a need to capture the self-evolved code properly; and/or (viii) when the code has successfully executed in the identified scenario, there is a need to deploy the scenario aware code in edge devices (for example, autonomous vehicles).

Some embodiments of the present invention may include one, or more, of the following operations, features, characteristics and/or advantages: (i) edge devices (for example, autonomous vehicles) will perform self-learning while addressing various scenarios; (ii) upon successfully execution of the scenario, if the code is self-adapted the system will tag the code with the scenario; (iii) the system will store the same appropriate code branch in a version of the management tool; (iv) the AI enabled system will analyze contextual scenarios based on IoT (internet of things) or visual feed analysis; (v) the system identifies what the code branch name should be for each contextual scenario; and/or (vi) the cloud hosted server will host the code branch.

Some embodiments of the present invention may include one, or more, of the following operations, features, characteristics and/or advantages: (i) different edge devices (for example, autonomous vehicles) perform different ways of self-adapting the code; (ii) while storing the code in a Cloud hosted branch, the code merging and branching module identifies the changes in the code, and accordingly store the same in the appropriate branch of the version control tool; (iii) the system (for example, autonomous vehicles) will evaluate the success and failure criteria of addressing the contextual scenarios; and/or (iv) the system evaluates how the code is self-adapted, and accordingly, identify if the self-adaptation of the code is completed such that the code can be base lined and stored in the appropriate branch version control system.

Some embodiments of the present invention may include one, or more, of the following operations, features, characteristics and/or advantages: (i) the system uses ontology hierarchy of the contextual scenarios; (ii) using existing contextual scenarios, hierarchical code branch is be created by the system in a cloud hosted version control tool system; (iii) branching is created by the system upon addressing any new scenario; (iv) the system predicts one or more contextual scenarios where the edge devices (for example, autonomous vehicles) will be performing the activities; and/or (v) the system proactively deploys the self-adapted code on the respective edge devices.

Figure 4:
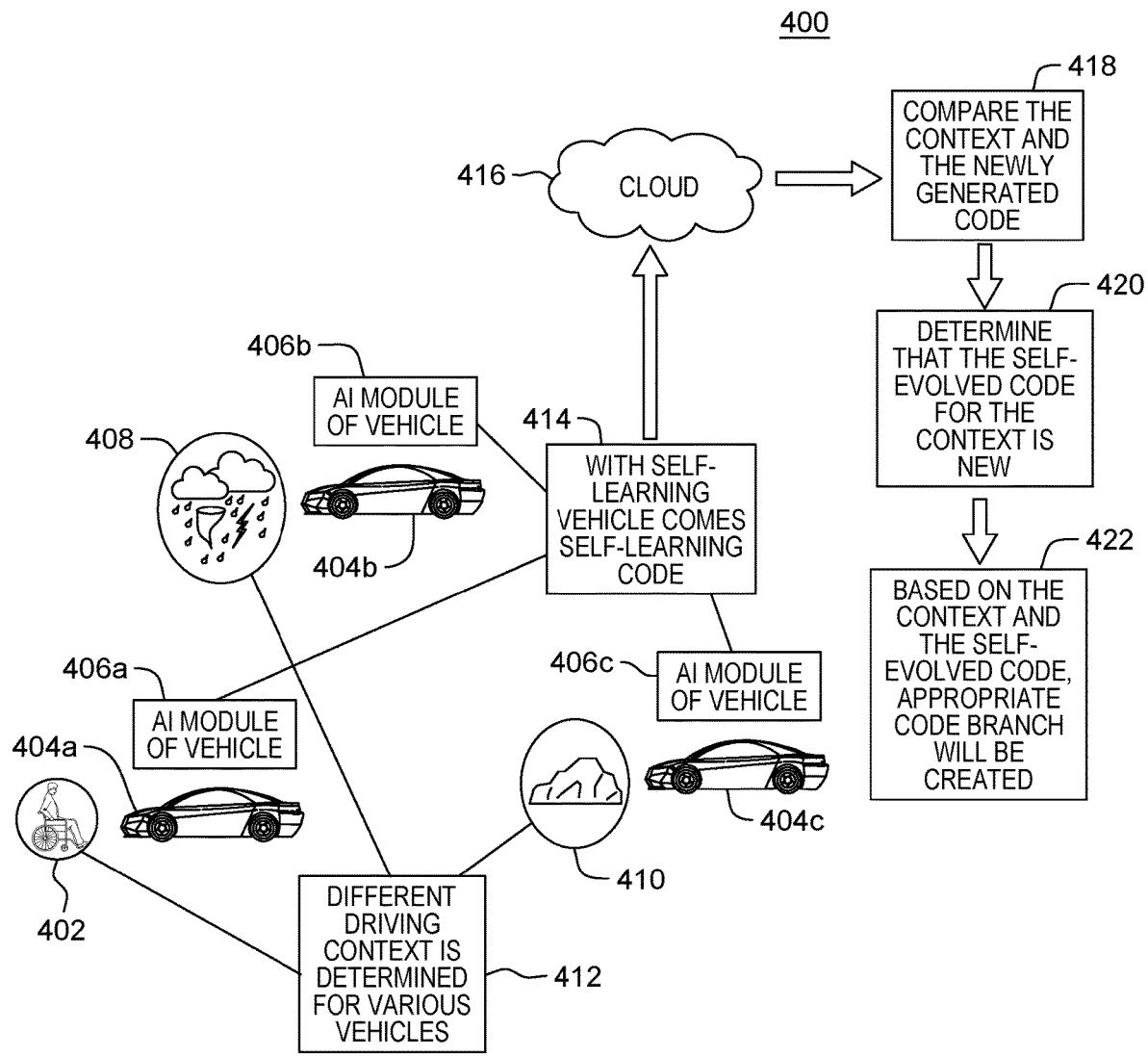
FIG. 4 is a block diagram of a second embodiment of a system according to the present invention.

FIG. 4, diagram 400 shows autonomous vehicles addressing different contextual scenarios. The AI module of the autonomous vehicle performs self-adapting of the code. The self-adapted code will be stored in the appropriate version of the branch control system in cloud hosted server. FIG. 4, diagram 400 includes: special needs block 402; vehicle blocks 404a, 404b and 404c; AI (artificial intelligence) blocks 406a, 406b and 406c; weather block 408; terrain block 410; driving context determination block 412; with self-learning vehicle and self-learning code block 414; cloud hosted server block 416; code/context comparison block 418; new code determination block 420; and code branch creation block 422.

A method according to an embodiment of the present invention includes the following operations (not necessarily in the following order): (i) the system includes AI enabled edge devices (for example, autonomous vehicles), which can self-learn and auto-adapt the code based on learning; (ii) the auto-adaption of the code happens locally in the autonomous vehicle while addressing the contextual scenario, which later syncs with the cloud hosted server; (iii) the cloud hosted server has a code version control system where it stores the self-adapted code in a different branch of the code repository; (iv) the cloud hosted system has code branch creation and merging modules, which create branching of the code; (v) the autonomous vehicles have a contextual scenario module, and perform identification based on the IoT feed, camera feed, etc.; (vi) the contextual scenarios are basically various driving scenarios for autonomous vehicles, like weather, accident, traffic, road condition, poor visibility, etc.; and (vii) while the vehicles are running, different sensors and camera feeds analyze the contextual scenario and identify the contextual scenario.

A method according to an embodiment of the present invention includes the following operations (not necessarily in the following order): (i) the context analysis module of the autonomous vehicle identifies what is the context and will provide the proper naming of the context; (ii) the autonomous vehicle identifies if the autonomous vehicle is self-adapting the code based on the identified contextual situation; (iii) the AI system of the autonomous vehicle identifies if the contextual situation is new, or are additional parameters in the known contextual situation; (iv) the system identifies what code has changed or what additional parameters in the code have been added with the self-adapted code module using the autonomous vehicle; (v) if the code is adapted while addressing the scenario, then the autonomous vehicle sends the information to the cloud hosted server; (vi) the cloud hosted server gathers the contextual situation, and also receives the self-adapted code; and (vii) the system identifies the changes applied in the code and what types of changes are applied.

A method according to an embodiment of the present invention includes the following operations (not necessarily in the following order): (i) the code version control system identifies the amount of changes in the code and validates with the contextual situation; (ii) the system considers what parameters are considered to derive the contextual situation and identifies if the code branch is already available; (iii) the version control system has an ontology hierarchy to segment the contextual situations and correlates how the contexts are related; (iv) the version control system creates a new branch if the identified context is not available or if additional parameters are added in the context to identify if a hierarchical path is to be created; (v) the system creates a new branch or identifies the appropriate branch and will store the self-adapted code with the appropriate version number; and (vi) the system identifies what contextual situation is executed in any vehicle and, accordingly, identifies which code branches are to be deployed in a proactive manner.

A method according to an embodiment of the present invention includes the following operations (not necessarily in the following order): (i) performs dynamic code branching of self-adapted code upon successful execution of a contextual scenario by artificial intelligence (AI) enabled edge devices (for example, autonomous vehicles); (ii) allows AI-enabled edge devices to perform self-adaptation upon successful execution of a contextual scenario while addressing various contextual scenarios and tagging the self-adapted code with the contextual scenario for storing the same appropriate code branch using a version control tool; (iii) allows the AI-enabled edge devices to analyze contextual scenarios based on Internet of Things (IoT) or visual feed analysis; (iv) identifies the code branch name for each such contextual scenario to allow the cloud-hosted server to host the code branch; (v) uses a code merging and branching module to identify changes in the code that is stored in the cloud-hosted branch; and (vi) when different AI-enabled edge devices performs different ways of self-adapting the code, the system accordingly stores the code changes in the appropriate branch of the version management tool.

A method according to an embodiment of the present invention includes the following operations (not necessarily in the following order): (i) evaluates the success and failure criteria of addressing the contextual scenarios and the self-adaptation of the code by the AI-enabled edge devices; (ii) the system accordingly identifies if the self-adaptation of the code is completed so that the code can be baselined and stored in the appropriate branch of the version control tool; (iii) uses ontology hierarchy of the contextual scenarios to creates a hierarchical code branch in the version control tool system; (iv) creates a new hierarchical code branch upon addressing any new scenario; and (v) predicts one or more contextual scenarios where the AI-enabled edge devices will perform the activities and proactively deploy the self-adapted code on the respective edge devices.

A method according to an embodiment of the present invention includes the following operations (not necessarily in the following order): (i) uses ontology hierarchy of the contextual scenarios to segment the contextual situations; (ii) correlates how the contexts are related; (iii) creates a hierarchical code branch in the version control tool system, thereby creating a new hierarchical code branch upon addressing any new scenario; (iv) predicts one or more contextual scenarios where the edge devices would be performing the relevant activities; (v) the system will proactively deploy the self-adapted code on the respective edge devices; (vi) uses ontology hierarchy of the contextual scenarios to segment the contextual situations; (vii) correlates how the contexts are related and then to creates a hierarchical code branch in the version control tool system, thereby creating a new hierarchical code branch upon addressing any new scenarios; and (viii) evaluates the success and failure criteria of addressing the contextual scenarios and how the code is self-adapted.

A method according to an embodiment of the present invention includes the following operations (not necessarily in the following order): (i) identifies if the self-adaptation of the code is completed and the code can be base lined and stored in the appropriate branch version control system; (ii) performs dynamic code branching of self-adapted code upon successful execution of a contextual scenario by artificial intelligence (AI) enabled edge devices; (iii) proactively deploys the self-adapted code on the respective edge devices by predicting the contextual scenarios; (iv) if the code is self-adapted, the system will tag the code with the scenario; (v) the system identifies the code branch name for each contextual scenario; (vi) the system will store the appropriate code branch in the version management tool; (vii) evaluates the success and failure criteria of addressing different contextual scenarios; and (viii) analyses the process of self-adaption and stores the data in the appropriate branch.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

Virtualized computing environments (VCEs): VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Cloud computing system: a computer system that is distributed over the geographical range of a communication network(s), where the computing work and/or computing resources on the server side are primarily (or entirely) implemented by VCEs (see definition of VCEs in previous paragraph). Cloud computing systems typically include a cloud orchestration module, layer and/or program that manages and controls the VCEs on the server side with respect to instantiations, configurations, movements between physical host devices, terminations of previously active VCEs and the like.

What is claimed is:

1. A computer-implemented method (CIM) comprising:
monitoring, using a set of sensor device(s), an artificial intelligence (AI) enabled edge device from a set of AI enabled edge devices storing edge device control code in a code repository including a plurality of code branches corresponding to a plurality of contextual scenarios;
during the monitoring, operating the AI enabled edge device in a first contextual scenario;
analyzing, by the AI enabled edge device and based on the monitoring, performance of the AI enabled edge device in the first contextual scenario to identify a code branch name for the first contextual scenario;
detecting that the AI enabled edge device is self-adapting code for the first contextual scenario; and
in response to the detecting and based on the identified code branch name, determining whether the plurality of code branches in the code repository includes a branch corresponding to the first contextual scenario.

2. The CIM of claim 1 further comprising:
using an ontology hierarchy of the plurality of contextual scenarios to segment the contextual scenarios;
using the ontology hierarchy of the plurality of contextual scenarios to correlate how the contextual scenarios are related; and
creating a first hierarchical code branch in a version control tool system corresponding to the first contextual scenario.

3. The CIM of claim 1 further comprising:
predicting a second contextual scenario where the AI enabled edge device can perform a predetermined activity; and
proactively deploying self-adapted code on the AI enabled edge device.

4. The CIM of claim 1 further comprising:
performing dynamic code branching of self-adapted code upon successful execution of the first contextual scenario by the AI enabled edge device.

5. The CIM of claim 1 wherein the set of sensor device(s) includes a video camera that outputs a visual feed.

6. The CIM of claim 1 wherein the set of sensor device(s) includes an Internet of Things (IoT) sensor device.

7. A computer-implemented method (CIM) comprising:
monitoring, using a set of sensor device(s), an artificial intelligence (AI) enabled autonomous vehicle (AV) from a set of AI enabled AVs storing edge device control code in a code repository including a plurality of code branches corresponding to a plurality of contextual scenarios;
during the monitoring, operating the AV in a first contextual scenario;
analyzing, by the AV and based on the monitoring by the set of sensor device(s), performance of the AV in the first contextual scenario to identify a code branch name for the first contextual scenario;
detecting that the AV is self-adapting code for the first contextual scenario; and
in response to the detecting and based on the identified code branch name, determining whether the plurality of code branches in the code repository includes a branch corresponding to the first contextual scenario.

8. The CIM of claim 7 further comprising:
using an ontology hierarchy of the plurality of contextual scenarios to segment the contextual scenarios;
using the ontology hierarchy of the plurality of contextual scenarios to correlate how the contextual scenarios are related; and
creating a first hierarchical code branch in a version control tool system corresponding to the first contextual scenario.

9. The CIM of claim 7 further comprising:
performing dynamic code branching of self-adapted code upon successful execution of the first contextual scenario by the AV.

10. The CIM of claim 7 wherein the set of sensor device(s) includes a video camera that outputs a visual feed.

11. A computer-implemented method (CIM) comprising:
monitoring, using a set of sensor device(s), an artificial intelligence (AI) enabled industrial robotic device (IRD) from a set of AI enabled IRDs storing edge device control code in a code repository including a plurality of code branches corresponding to a plurality of contextual scenarios;
during the monitoring, operating the IRD in a first contextual scenario;
analyzing, by the IRD and based on the monitoring, performance of the IRD in the first contextual scenario to identify a code branch name for the first contextual scenario;
detecting that the IRD is self-adapting code for the first contextual scenario; and
in response to the detecting and based on the identified code branch name, determining whether the plurality of code branches in the code repository includes a branch corresponding to the first contextual scenario.

12. The CIM of claim 11 further comprising:
using an ontology hierarchy of the plurality of contextual scenarios to segment the contextual scenarios;
using the ontology hierarchy of the plurality of contextual scenarios to correlate how the contextual scenarios are related; and
creating a first hierarchical code branch in a version control tool system corresponding to the first contextual scenario.

13. The CIM of claim 11 further comprising:
performing dynamic code branching of self-adapted code upon successful execution of the first contextual scenario by the IRD.

14. The CIM of claim 11 wherein the set of sensor device(s) includes an Internet of Things (IoT) sensor device.

15. The CIM of claim 1, further comprising updating the code repository based on the self-adapted code.

16. The CIM of claim 15, wherein the updating comprises:
in response to determining that the plurality of code branches does not include the branch corresponding to the first contextual scenario, creating a hierarchical code branch corresponding to the first contextual scenario in the code repository; and
storing the self-adapted code in the hierarchical code branch.

17. The CIM of claim 15, wherein the updating comprises, in response to determining that the plurality of code branches includes the branch corresponding to the first contextual scenario, applying changes to code stored in the branch based on the self-adapting.

18. The CIM of claim 15, further comprising deploying the self-adapted code on a second device from the set of AI enabled edge devices in response to determining that the second device is operating in the first contextual scenario.

* * * * *